(12) United States Patent
Wilson

(10) Patent No.: US 8,473,018 B2
(45) Date of Patent: *Jun. 25, 2013

(54) MOBILE DEVICE CRADLE HAVING AN INTEGRATED ANTENNA OR AMPLIFIER

(75) Inventor: James W. Wilson, St. George, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,994

(22) Filed: Mar. 1, 2010

(65) Prior Publication Data

US 2010/0151917 A1    Jun. 17, 2010

Related U.S. Application Data

(63) Continuation-in-part of application No. 12/125,738, filed on May 22, 2008, now Pat. No. 7,684,838.

(60) Provisional application No. 60/939,449, filed on May 22, 2007.

(51) Int. Cl.
*H04M 1/00*     (2006.01)

(52) U.S. Cl.
USPC .............................. 455/575.9; 455/7; 455/11.1

(58) Field of Classification Search
USPC ................................... 455/575.9, 7, 11.1, 15
See application file for complete search history.

(56) References Cited

U.S. PATENT DOCUMENTS

| | | | | |
|---|---|---|---|---|
| 5,457,814 A | * | 10/1995 | Myrskog et al. | 455/571 |
| 6,052,603 A | * | 4/2000 | Kinzalow et al. | 455/557 |
| 6,175,748 B1 | * | 1/2001 | Aboukhalil et al. | 455/571 |
| 6,230,031 B1 | * | 5/2001 | Barber | 455/571 |
| 6,690,915 B1 | * | 2/2004 | Ito et al. | 455/7 |
| 6,892,080 B2 | * | 5/2005 | Friesen et al. | 455/571 |
| 2002/0002067 A1 | * | 1/2002 | Norimatsu | 455/571 |
| 2002/0028655 A1 | | 3/2002 | Rosener et al. | |
| 2002/0045461 A1 | | 4/2002 | Bongfeldt | |
| 2003/0100351 A1 | | 5/2003 | Friesen et al. | |
| 2004/0166873 A1 | | 8/2004 | Simic et al. | |
| 2004/0219876 A1 | | 11/2004 | Baker et al. | |
| 2004/0266338 A1 | | 12/2004 | Rowitch | |
| 2005/0170867 A1 | | 8/2005 | Friesen et al. | |
| 2007/0071128 A1 | | 3/2007 | Meir et al. | |

(Continued)

FOREIGN PATENT DOCUMENTS

CA    2631932    4/2011

OTHER PUBLICATIONS

U.S. Appl. No. 12/125,738, May 27, 2009, Office Action.
U.S. Appl. No. 12/257,738, Jan. 7, 2010, Notice of Allowance.

*Primary Examiner* — Ajit Patel

(74) *Attorney, Agent, or Firm* — Maschoff Brennan

(57) ABSTRACT

Disclosed is a mobile device cradle, having a body and one or more docking members attached to the body for removably receiving a mobile device capable of sending and receiving communications via a communication network in the form of signals, an integrated antenna capable of communicating signals to and from the mobile device; and an integrated bidirectional amplifier in the body having a first and a second amplifier; a connection to a power adapter. Optionally, embodiments include a means for charging a battery of the mobile device. The mobile device cradle can be mounted inside a vehicle and used to improve the signal between the mobile device and the communication network.

10 Claims, 5 Drawing Sheets

U.S. PATENT DOCUMENTS

| | | | |
|---|---|---|---|
| 2007/0077965 A1* | 4/2007 | Fox | 455/557 |
| 2007/0155314 A1 | 7/2007 | Mohebbi | |
| 2007/0197264 A1* | 8/2007 | Itsukaichi | 455/569.2 |
| 2009/0131131 A1 | 5/2009 | Wilson | |

* cited by examiner

MOBILE DEVICE CRADLE HAVING AN INTEGRATED ANTENNA OR AMPLIFIER

CROSS REFERENCE TO RELATED APPLICATIONS

This application claims the benefit of U.S. application Ser. No. 12/125,738, filed May 22, 2008, now issued as U.S. Pat. No. 7,684,838 and entitled MOBILE DEVICE CRADLE HAVING INTEGRATED ANTENNA AND AMPLIFIER, which in turn claims the benefit of U.S. Provisional Application Ser. No. 60/939,449 filed May 22, 2007, both of which are incorporated by reference in their entirety.

BACKGROUND OF THE INVENTION

1. The Field of the Invention

The present invention relates to improving cellular network signals. More particularly, embodiments of the present invention relate to using a device cradle configured to removably receive handsets and other mobile devices which is coupled to antennas and/or amplifiers in order to improve the cellular network signal between the mobile device and the cellular network.

2. The Relevant Technology

In recent years, cellular ("cell" or "mobile") telephones have dramatically increased in popularity. A growing number of people are relying exclusively on cell phones, and are abandoning their traditional land line telephone services in favor of the convenience of the mobility of cell phones. This increase in cell phone reliance has resulted in the need for reliable cellular signal coverage over a wider area.

Using cell phones in areas which have a weak signal often results in dropped calls which can be both annoying for the cell phone user and expensive for the wireless service provider. Dropped calls typically occur when the signal between the cell phone and the base station is lost. This loss of signal may occur for a number of reasons, including interference due to buildings or mountains and/or an increase in distance between the cell phone and the base station. Thus, one situation where dropped calls are prevalent is when the cell phone user is driving long distances in remote areas where there are fewer base stations capable of reliably capturing the signal from the cell phone. As such, there is a need for a system and method of increasing the reliability of cell phones in areas where the signal between the cell phone and base station is likely to be lost.

Attempts have been made to increase the reliability of cell phones through use of cell phone signal boosters, also known as cellular network amplifiers. Cellular network amplifiers receive the cellular signal sent from a base station, amplify the signal, and retransmit the signal to one or more cell phones. Similarly, the cellular network amplifier receives the signals from one or more cell phones, amplifies the signals, and retransmits the signals to the base station.

Cellular network amplifiers are typically placed in relatively close proximity to one or more cell phones, and serve the purpose of increasing the level of the signals being transmitted to and from the cell phones so that the cell phones can communicate with base stations that would otherwise be out of range. Some amplifiers are configured to be placed in a separate location from the cell phone itself. For example, a cellular network amplifier may be placed away from the cell phone in a user's vehicle, or in or near a building that would otherwise have poor reception.

BRIEF SUMMARY OF THE INVENTION

These and other limitations are overcome by embodiments of the invention which relate to systems and methods for improving the cellular network signal between a mobile device and a cellular network. More particularly, embodiments of the present invention relate to using a device cradle that is preferably mounted in the interior of a vehicle which is configured to removably receive handsets and other mobile devices. The device cradle is coupled or integrated with antennas and/or amplifiers in order to improve the cellular network signal between the mobile device and the cellular network.

One aspect of the invention is a mobile device cradle, comprising one or more docking members capable of removably receiving a mobile device which is capable of sending and receiving communications via a communication network in the form of signals, a connection to an antenna capable of communicating signals to and from a base station of the communication network, a means for charging a battery of the mobile device, and a means for communicating signals to and from the mobile device.

As described more fully below, embodiments of the invention may be used in a variety of configurations, including those where an antenna and/or amplifier are connected to or integrated with the device cradle. A second aspect of the invention is a mobile device cradle, comprising one or more docking members for removably receiving a mobile device capable of sending and receiving communications via a communication network in the form of signals, a first connection configured to be coupled to an external antenna for communicating signals to and from a base station of the communication network, an integrated antenna for communicating signals to and from the mobile device, a bidirectional amplifier, a second connection configured to be coupled to a power adapter for providing power to the bidirectional amplifier, a battery charger capable of charging the battery of the mobile device, and with a base for mounting the mobile device cradle to a vehicle. Thus, the device cradle may be coupled to an amplifier capable of amplifying the signals that are sent and received in the communications system in order to improve the strength of the signal in areas where the signal may be weak.

One advantage of using a configuration with many integrated components is that all the components are located in a central location, meaning that there are less external connections and no need to locate places for the various components. In some embodiments, such as when the mobile device cradle of the invention is used in a small or compact car, there is not sufficient room to place the various components separately. Additionally, embodiments of the invention are capable of charging the battery of the device while the device is stored in the cradle.

Another aspect of the invention is a mobile device cradle which comprises one or more docking members for removably receiving a mobile device capable of sending and receiving communications via a communication network in the form of signals, a first connection configured to be coupled to an external antenna for communicating signals to and from a base station of the communication network, an integrated antenna for communicating signals to and from the mobile device, a second connection configured to be coupled to an external amplifier, a battery charger capable of charging the battery of the mobile device, a breakout connector for connecting the mobile device to an external device, and a base for mounting the mobile device cradle to a vehicle. Thus, in another configuration, the amplifier may be separate from the device cradle and the cradle may enable an external device to connect to the mobile device.

One advantage of using a configuration with an external amplifier is that the device cradle may be smaller, with less integrated components. Furthermore, the amplifier may be placed in a location where there is more space for the component, such as in the back of a vehicle.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
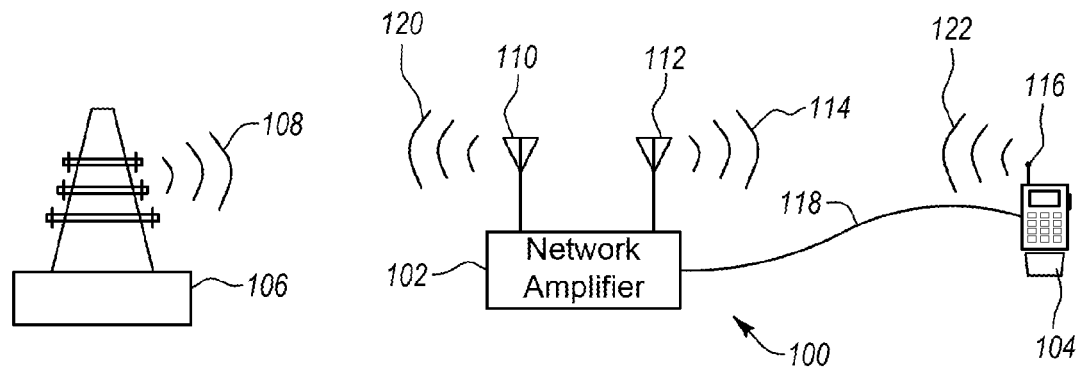
FIG. 1 illustrates a block diagram of a cellular communications system currently used in the art.

Embodiments of the invention relate to antennas and amplifiers that enhance the ability of a device such as a cellular telephone to communicate in a wireless network. The present invention extends to a mobile device cradle that is connected to an antenna with an increased capacity of transmitting and receiving signals from the wireless network and/or a bidirectional amplifier which is capable of boosting uplink and downlink signals between a base station of the wireless network and cellular device. In the present invention, the mobile device cradle is configured to removably receive the cellular telephone and charge the cellular telephone while cradling the telephone.

One embodiment of the mobile device cradle includes an integrated antenna for transmitting and receiving signals to and from the mobile device. Alternately, the mobile device cradle includes a connection configured to be coupled to an external antenna that can be placed, in one embodiment, on the exterior of a vehicle in which the mobile device cradle is used. Another embodiment of the mobile device cradle includes an integrated amplifier which is capable of amplifying the signals between the wireless network and the cellular device. In another embodiment, the mobile device cradle may send and receive signals to an external amplifier that may be located in a convenient location within the vehicle.

For purposes of the present invention, the following definitions are provided. The terms "cellular" and "cellular network" refer to a wireless telephone network that connects radio transmissions between a mobile phone and a system of multiple cell sites, each including an antenna and a base station, to a mobile telephone switching office, and ultimately to the public wireline telephone system. Cellular calls are transferred from base station to base station as a user travels from cell to cell. One of skill in the art can appreciate that embodiments of the invention can be applied to other wireless networks as well.

By way of example, the phrase "cell phone" refers to a wireless device that sends and receives messages using radiofrequency signals in the 800-900 megahertz (MHz) portion of the radiofrequency (RF) spectrum, and the phrase "PCS phone" (personal communication system phone) refers to a wireless device that uses radiofrequency signals in the 1850-1990 MHz portion of the RF spectrum. For purposes of simplicity, as used herein, the terms "cell phone" and "handset" are intended to cover both "cell phone" and "PCS phone", as defined above, as well as other handheld devices. Likewise, as used herein, the phrase "cellular signal" refers to signals being transmitted both in the cell phone spectrum (i.e., 800-900 MHz) and in the PCS spectrum (i.e., 1850-1990 MHz). One of skill in the art can appreciate that embodiments of the invention are not limited to operation in these spectrums, but can be applied in other portions of the frequency spectrum as well.

"Cell site" and "base station" are used herein interchangeably. Cell site and base station are defined as the location where the wireless antenna and network communications equipment is placed. A cell site or base station typically includes a transmitter/receiver, antenna tower, and radio controllers for maintaining communications with mobile handsets within a given range.

The term "uplink" refers to the transmission path of a signal being transmitted from a handset to a base station. The term "downlink" refers to the transmission path of a signal being transmitted from the base station to the handset. The phrases "uplink signal" and "downlink signal" are not limited to any particular type of data that may be transmitted between a handset and a base station, but instead are simply used to specify the direction in which a signal is being transmitted.

FIG. 1 shows an exemplary communications system 100 that is typically used in the current art. The communications system 100 may be a cellular telephone wireless network or other wireless network. In this example, a network amplifier 102 amplifies the signals transmitted between a base station 106 and a handset 104. In a typical system, the network amplifier 102 is located in close proximity to the handset 104 in comparison to the distance to the base station 106. The base station 106 transmits a signal 108 into the surroundings, which is attenuated for various reasons known to one of skill in the art as it travels outward from the base station 106. An antenna 110 receives the signal 108 and converts the signal into an electrical equivalent.

The network amplifier 102 amplifies the electrical signal and communicates the amplified signal to the handset 104 in one of two ways. First, the amplifier 102 may retransmit the electrical signal from a second antenna 112 as an amplified RF signal 114. The amplified signal 114 is received by an antenna 116 of handset 104, which processes the signal and ultimately communicates the appropriate content to a user of handset 104. Alternately or additionally, the amplifier 102 may retransmit the electrical signal over hardwired link 118. As previously indicated, the network amplifier 102 may be an integral part of the cradle that holds the handset 104.

Similarly, the handset 104 may communicate content to the network amplifier 102 by transmitting an RF signal from the antenna 116, which is ultimately received by the antenna 112. Alternately or additionally, the handset 104 may communicate content to the network amplifier 102 by transmitting an electrical signal over the hardwired link 118. The network amplifier 102 amplifies the received signal and retransmits the signal using the antenna 110. The transmitted signal is received by the base station 106, which may perform a number of operations on the signal, as determined by the wireless service provider.

Figure 2:
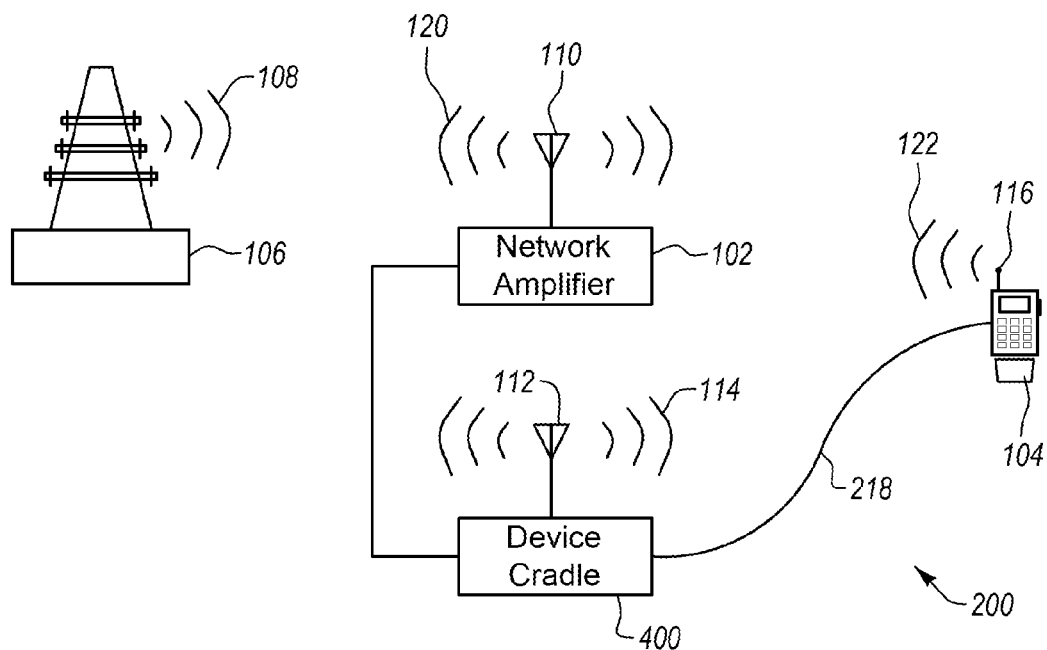
FIG. 2 is a block diagram illustrating a cellular communications system using the mobile device cradle of the present invention.

In comparison to FIG. 1, FIG. 2 shows an exemplary communications system 200 which may be used in association with the present invention. Similar to the configuration above, the communications system 200 may be a cellular telephone wireless network or other wireless network. In this example, the network amplifier 102 and/or the antennas 110 and 112 may be integrated into a device cradle 400 which is configured to receive the handset 104. Thus, aspects of the present invention use a device cradle 400 which is capable of improving the signal transmitted between a base station 106 and a handset 104. In this example, a network amplifier 102 is shown as connected to the device cradle 400. In other configurations, such as the configuration shown in FIG. 6C, the present invention may operate without a network amplifier 102.

Thus, as described more fully below, a variety of configurations may be used in association with the present invention, wherein various components may be integrated into the device cradle 400, so as to amplify or strengthen the signal between the handset 104 and the base station 106. Thus, in some configurations an amplifier 102 may used to amplify the signal. The amplifier 102 may be located away from the device cradle 400, whereas in other configurations the amplifier 102 may be integrated into the device cradle 400. Similarly, either one or both of the antennas 110 or 112 may be integrated into the device cradle 400, or may be separate from the device cradle 400. In most instances, only the antenna 112 will be integrated into the device cradle 400 in order to limit the interference from the antenna 110 with the operation of the amplifier 102 when the amplifier 102 is integrated into the antenna.

Figure 3:
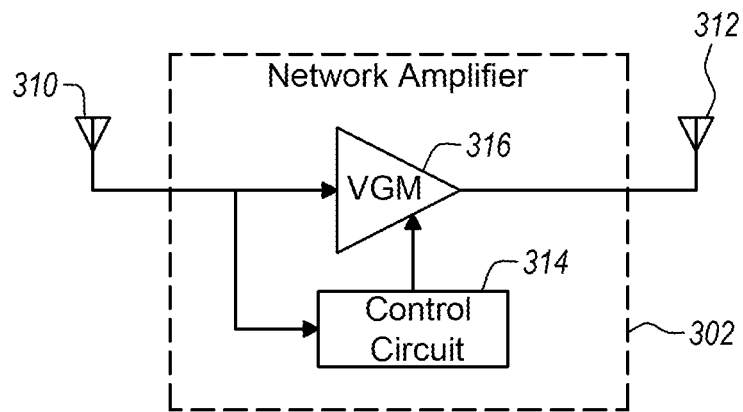
FIG. 3 is a schematic of a unidirectional cellular network amplifier.

FIG. 3 illustrates a generalized unidirectional network amplifier 302 configured to produce an optimal gain level, that may be used in accordance with the present invention. The network amplifier 302 is connected to an antenna 310 which is configured to receive a cellular signal transmitted by a base station. The antenna 310 converts the received signal into an electrical signal. In one embodiment, the electrical signal may be received by a variable gain module (VGM) 316, which may apply an amplification factor to the electrical signal. In one embodiment, the electronic signal is communicated via a second antenna 312, which transmits the adjusted electrical signal as an RF signal, to be received by one or more handsets or other devices.

In one embodiment, the variable gain module 316 may be controlled by a control circuit 314. The control circuit 314 may receive the electrical signal from the antenna 310, and based on the properties of the electrical signal, determines an optimal amplification factor that is applied to the electrical signal. The control circuit 314 provides control signals to the variable gain module 316. The control signals instruct the gain module 316 as to the amplification factor that should be applied to the electrical signal. Many factors may be accounted for when calculating the required amplification factor. Factors include, by way of example and not limitation, the level or strength of the electrical signal and whether there is any indication that the network amplifier 302 tends to oscillate or overload the cellular network in any way.

The amplification factor, in one embodiment, is a multiplier that is applied to the electrical signal. The amplification factor can result in either an amplified or attenuated output signal. In other words, where the absolute value of the amplification factor is less than one, the amplified adjusted signal will have a lower amplitude than the original electrical signal. Conversely, when the absolute value of the amplification factor is greater than one, the amplified adjusted signal will have a greater amplitude than the original electrical signal.

Figure 4:
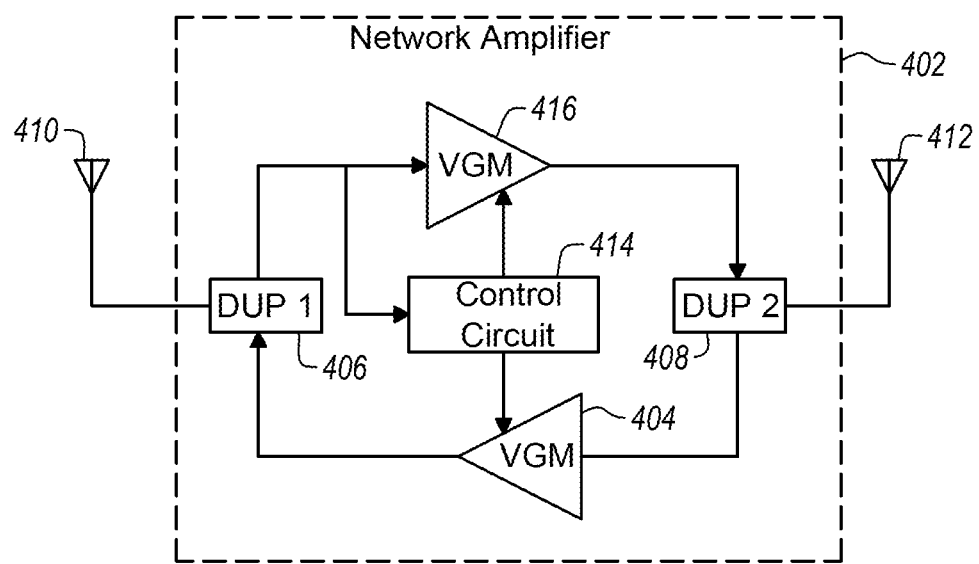
FIG. 4 is a schematic of a bidirectional cellular network amplifier.

FIG. 4 illustrates one embodiment of a bidirectional network amplifier 402 configured to control the amplification of cellular signals being transmitted between a base station and a handset. Similar to network amplifier 302 illustrated in FIG. 3, a cellular signal is received from a base station at the antenna 410 and is passed to the amplifier 416. In one embodiment, the amplifier 416 may be a variable gain module, and a control circuit 414 may be used for controlling the amplification factor of variable gain module 416. The amplified signal may be connected to a second antenna 412 or a hardwired link such as the link 118 of FIG. 1, which transmits or receives a cellular signal to or from at least one handset.

Bidirectional cellular amplifier 402 is also configured to receive signals from one or more handsets, amplify those signals, and retransmit the signals to a base station. A signal from a handset may be received by antenna 412. The signal may be routed to a second variable gain module 404, which may apply an amplification factor to the signal. The amplification factor may be determined and controlled by control circuitry 414.

In order to allow antennas 410 and 412 to simultaneously transmit and receive signals, duplexers (DUP) 406 and 408 are provided by way of example. A duplexer is defined as an automatic electrical device that permits the use of the same antenna for concurrently transmitting and receiving. More generally, a duplexer is a three port device with one common port "A" and two independent ports "B" and "C". Ideally, signals are passed from A to B and from C to A, but not between B and C. For example, the duplexer 406 receives an RF signal from a base station and converts the signal into a first electrical signal, which is routed to the inputs of the variable gain device 416 and the control circuitry 414. The duplexer 406 simultaneously receives a second electrical signal from the output of the variable gain module 404, and causes this signal to be transmitted as an RF signal via the antenna 410.

The control circuitry 414 may be configured to accomplish various objectives when determining the amplification factors to be applied to the variable gain modules 404 and 416. Exemplary objectives include, but are not limited to, i) setting the power level at which the signals are transmitted at a sufficient level to ensure that the signals reach a target destination; and ii) ensuring that the signals transmitted from the network amplifier are transmitted at a power level that substantially eliminates the interference that would otherwise be introduced into the surrounding cellular network. A detailed description of control circuits that may be used herein for controlling the amplification levels of the uplink and downlink signals is provided in co-pending U.S. patent application Ser. Nos. 11/449,225, filed Jun. 8, 2006, 11/535,376, filed Sep. 26, 2006, and 11/457,384, filed Jul. 13, 2006, which applications are incorporated herein by reference in their entirety. However, the integrated handset cradles and amplifiers, as described in further detail below, may or may not include a control circuit 414 and variable gain amplifiers 404 and 416. Instead, in one embodiment, the integrated handset cradles and amplifiers may apply a constant gain level to the uplink and/or downlink signals.

Figure 5:
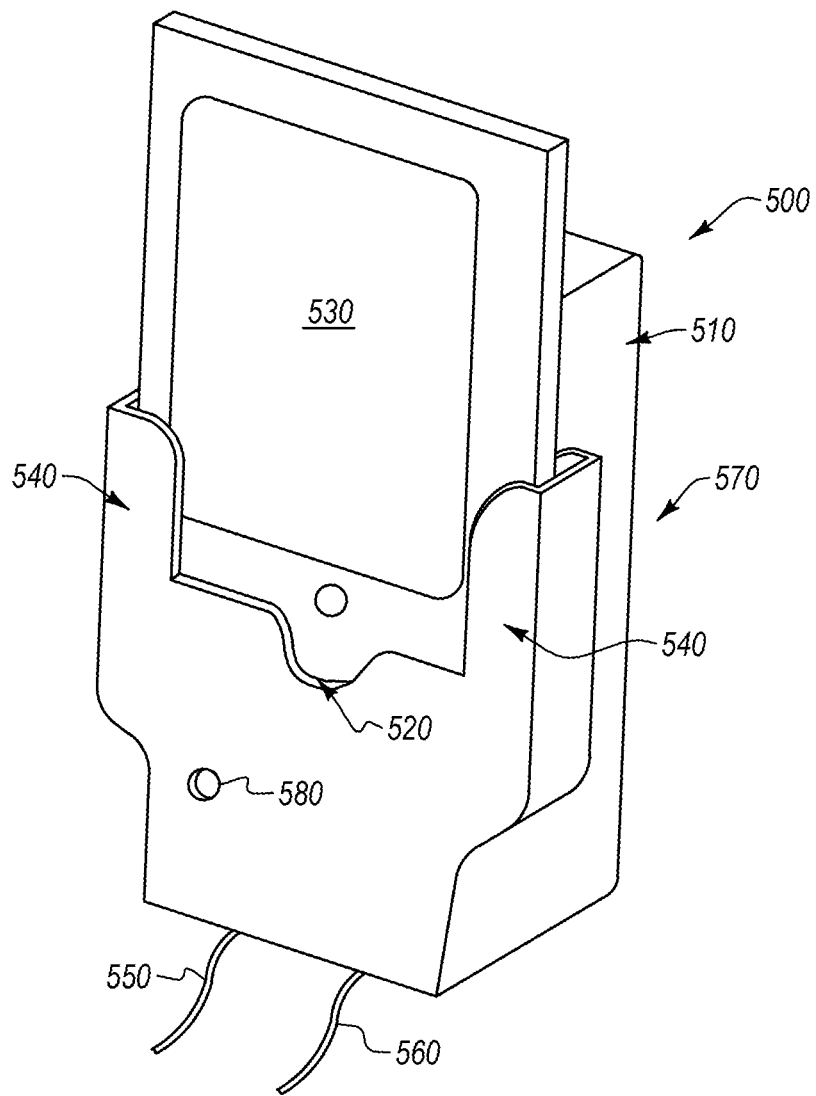
FIG. 5 is a perspective view of an example of a mobile device cradle in which the principles of the invention may be implemented.

FIG. 5 illustrates one embodiment of a network amplifier implemented in a mobile device cradle 500 configured to removably receive a cellular phone, handset, or other mobile device 530. In this example, the mobile device cradle 500 comprises an integrated amplifier and antenna 510 for communicating cellular signals to and/or from the cellular phone 530. The amplifier may correspond to the unidirectional network amplifier 302 of FIG. 3, or the bidirectional network amplifiers 102 and 402 of FIGS. 2, and 4. The integrated antenna may correspond to any of the antennas 112, 312, or 412 of FIGS. 2, 3 and 4. The mobile device cradle 500 includes additional components such as docking members 540, a battery charger 520 capable of charging the battery of the phone 530, a break-out connector 580 whereby an external device may connect to the phone 530, and a base 570, both of which will be discussed in greater detail below. While particular components are illustrated discretely in FIG. 5, one skilled in the art will appreciate that some or all of these and other components can be combined and arranged in such a way as to give the appearance of an apparatus having more or fewer components than are actually included within the example mobile device cradle 500.

In one embodiment, and instead of or in addition to the integrated antenna 520, a hardwired connection, such as the hardwired connection 218 of FIG. 2, can be provided for communicating electrical signals to and from the cellular phone 530. According to this embodiment, the cradle 500 and cellular phone 530 can each include one or more electrical connections such that when the cellular phone 530 is placed within the mobile device cradle 500, corresponding electrical connections are made, thereby enabling the communication of electrical signals between the cradle 500 and cellular phone 530. Alternatively, an extendible wire may be provided between the cellular phone 530 and the mobile device cradle 500 such that a signal may be passed to and from the cellular phone when it is removed from the mobile device cradle, such as when the cellular phone is removed from the mobile device cradle.

To facilitate the reception of the cellular phone 530 by the cradle 500, the cradle and cellular phone may be configured with complementary docking members. For instance, the cradle 500 may include a male or female docking member while the cellular phone 530 includes a complementary female or male docking member. Alternately, only one of the cradle 500 and cellular phone 530 may be configured with one or more docking members. For instance, in the present example, the cradle 500 includes docking members 540 configured to receive and retain the cellular phone 530 within the cradle 500, while the cellular phone 530 lacks docking members.

Another component which facilitates reception of the cellular phone 530 by the cradle is the battery charging component 520, which may comprise a dock connector, which may be used both to charge the cellular phone 530 as well as to control functions on the cellular phone 530. Thus, for example, any signals received by an external device connected to the breakout connector 580 of the cradle 500 may be transmitted to and from the phone 530 via the battery charging component 520 comprising a dock connector. This enables users to continue to use external devices in association with the phone while the signal to and from the phone is amplified by the integrated antenna and amplifier 510. Thus, for example, a user may attach a hands-free communication device, such as a Bluetooth mobile device headset or the like, to the cradle via the breakout connector 580 and make phone calls while the phone 530 is cradled and charging in the cradle 500. Similarly, other external devices may be connected to the phone 530 via the breakout connector 580, such as a radio transmitter, a cassette adaptor, external speakers, and the like.

In one embodiment, the mobile device cradle 500 is also configured to connect to an external antenna for communicating cellular signals to and from a base station. This external antenna may correspond to the antennas 110, 310, and 410 of FIGS. 2, 3 and 4, respectively. In the present embodiment, the cradle 500 connects to the external antenna via the external antenna cable 550. Although not illustrated, the mobile device cradle 400 may include an electrical port, jack, socket or other connection configured to removably receive the cable 550. Alternately or additionally, the connection between the cable 550 and cradle 500 can be of a more permanent nature, such as a soldered connection.

In some embodiments of the invention, the mobile device cradle 500 additionally includes a base or mounting member 570. The base 570 may be used for mounting the mobile device cradle 500 within a vehicle, such as on a dashboard, console, or other location within a vehicle. The base or mounting member 570 can be removable or more permanent and can include adhesives, fasteners, and the like or any combination thereof.

Figure 6A:
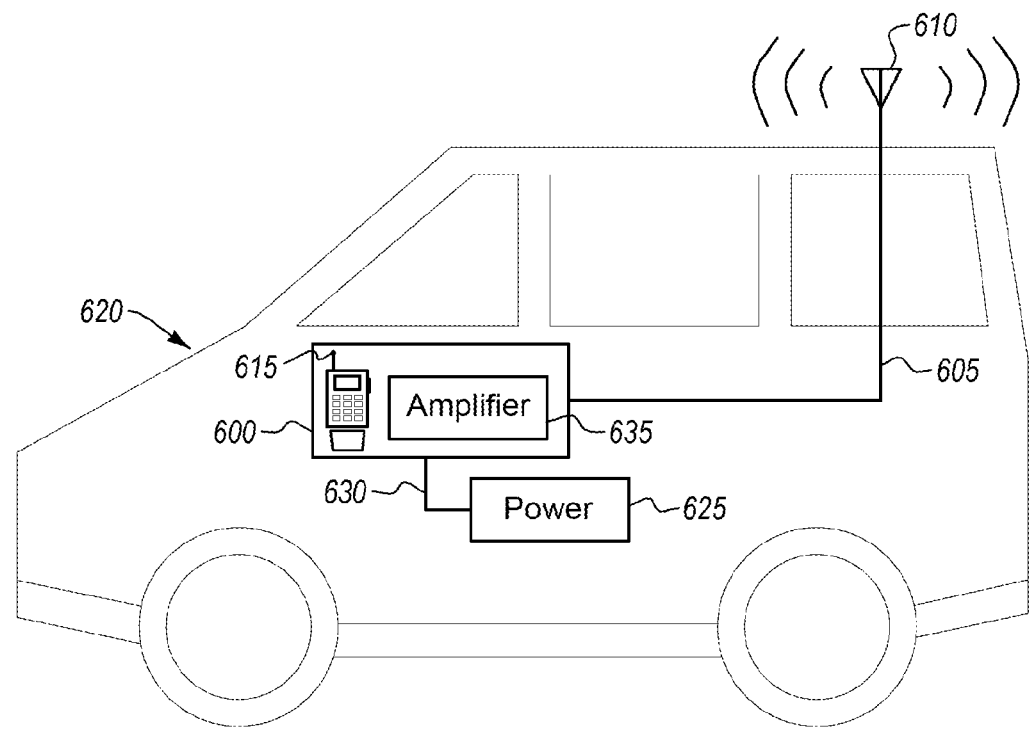
FIGS. 6A-6C are block diagrams illustrating embodiments of the mobile device cradle that may be used in a vehicle.
Figure 6B:
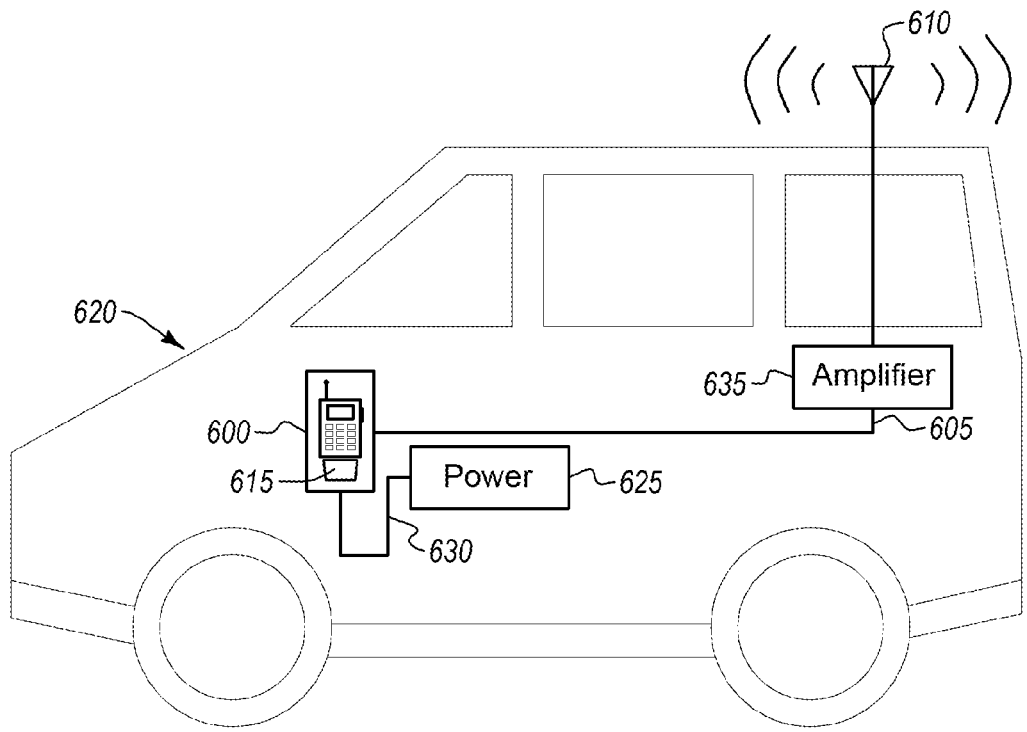

The present embodiment may be useful in an automobile or other vehicle. For example, as shown in FIGS. 6A and 6B, an external antenna 610 can be attached to the exterior of a vehicle 620, thereby improving the transmission and reception of the antenna 610. Because a vehicle typically attenuates a cellular signal by approximately 15 dB, using an external antenna 610 may drastically improve cellular signal reception. As previously described, a cable 605 permits the mobile device cradle 600 to be connected to the external antenna 610 when the external antenna 610 is attached to the exterior of the vehicle 620.

To further enable the use of the cradle 600 in a vehicle, the mobile device cradle 600 may be connected to a power source 625 via a power cable 630. As with the external antenna cable 605, the power cable 630 can be removably connected electrically by a jack, socket or other connection of the cradle 600, and/or the connection between the cradle 600 and cable 630 can be of a more permanent nature. The power supplied by the power source 625 may then be used to charge the device via the battery charger. In one embodiment of the invention, the power cable 630 may include an adapter that can be inserted into an ANSI/SAE J563 compliant socket (commonly used for automotive cigarette lighters, etc.) to power the mobile device cradle 600 and/or the cellular phone 615. Alternately or additionally, the cradle 600 can be battery-powered. In one embodiment, a cellular downlink signal transmitted by a base station may be received by the external antenna 610, converted to an electrical signal and provided, via the cable 605, to the mobile device cradle 600.

In FIG. 6A, the electrical signal is processed at the mobile device cradle 600 using an integrated amplifier 635 which is capable of amplifying the electrical signal. In one embodiment, the amplifier may be a VGM amplifier that is capable of being controlled by a control circuit that may be used for determining an amplification factor and using the amplifying factor to amplify the electrical signal. The amplified electrical signal can then be transmitted to the cellular phone 615 via either an integrated antenna 112 or a hardwired connection 218 from the amplifier 615 within the handset cradle 600. In return, an uplink signal can be received from the cellular phone 615 via an integrated antenna 112 or hardwired connection 218, and processed and/or amplified by the amplifier 615. In one embodiment, processing and/or amplifying the uplink signal may include receiving the uplink signal at a second VGM (and at the controller circuit in some embodiments), and applying the same or a different amplification factor to the uplink signal. The amplified uplink signal is then provided, via the cable 605, to the external antenna, which converts the amplified uplink signal to a cellular signal for transmission to the base station.

In FIG. 6B, the amplifier 635 is located external to the device cradle 600, and is connected to both the external antenna 610 and the device cradle 600 via a connection 605. One advantage of such configurations is that the device cradle 600 may be more compact than in configurations where the amplifier 635 is integrated with the device cradle. The amplifier 635 may then be located in another location within the vehicle with more space, such as in the back of the vehicle near the external antenna.

Figure 6C:
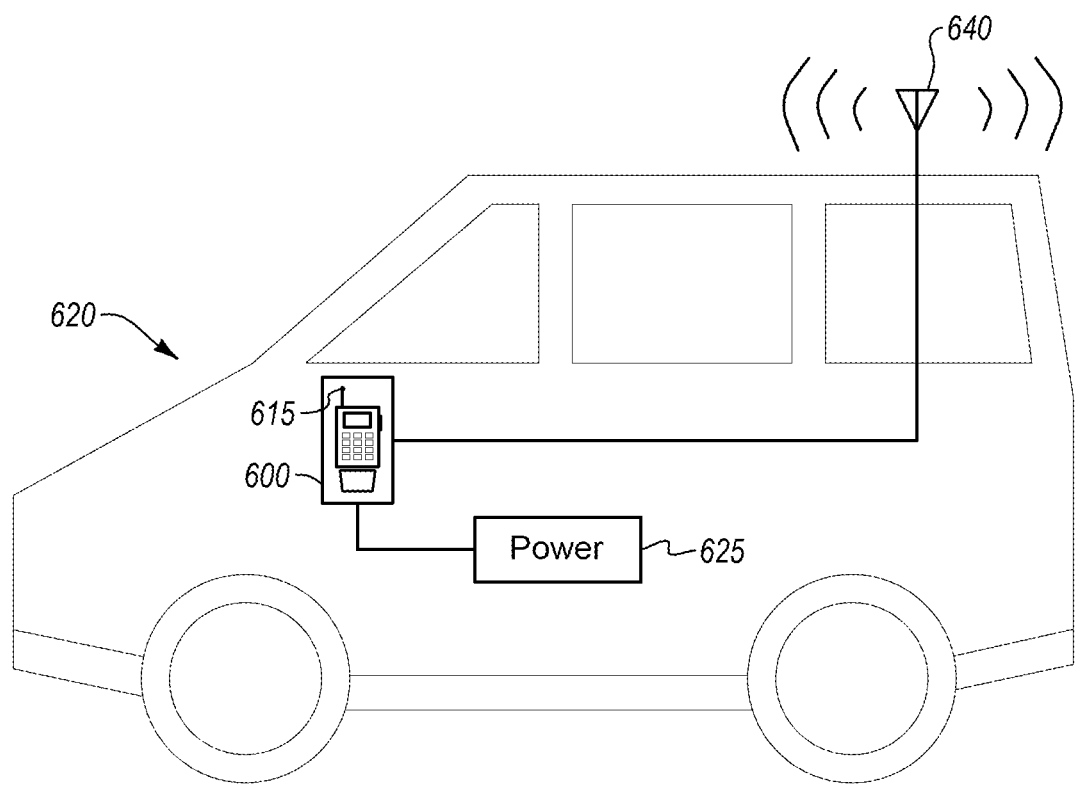

FIG. 6C illustrates an embodiment of the invention wherein no amplifier is used. Instead, the device cradle 600 is configured to be connected to an external antenna 640, without using the amplifier 635 as shown in FIGS. 6A and 6B. Thus, in this example, the cradle's 600 antenna 640 would couple signals that are sent to and from the mobile device 615 without using an amplifier. Although currently amplifiers are used to amplify the signals, the integrated antenna 640 may adequately transmit the signal without use of an amplifier. This may also be accomplished if the connection to the mobile device 615 is made using a cable such as, by way of example only, connection 218.

Although the previous embodiments of the invention have been described with reference to a device cradle that is capable of receiving only a single mobile device, the present may also be used to amplify or improve the signal of a plurality of devices. For example, although the only one device may reside in the device cradle, other devices within the vicinity of the device cradle may utilize the amplifier or antenna associated with the device cradle to improve a signal sent from the devices to the device cradle via a wireless connection. Thus, a single device cradle may be used to amplify or improve the signals for a plurality of devices.

Thus, as described above, embodiments of the present invention enable a user to use a device cradle to improve the existing signal between his or her mobile device and its corresponding communications network. Using various configurations of antennas and amplifiers, the present invention may be embodied in other specific forms without departing from its spirit or essential characteristics.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mobile device cradle, comprising:
   a body;
   one or more docking members attached to the body and configured to removably receive a mobile device;
   a first connection configured to be coupled to an external antenna to communicate signals to and from a base station of the communication network;
   an integrated antenna in the body operable to communicate signals to and from the mobile device;
   an integrated bidirectional amplifier in the body, the integrated bidirectional amplifier including:
      a first amplifier having an input coupled to the first connection and an output coupled to the integrated antenna, the first amplifier operable to apply a first amplification factor to signals received from the base station; and
      a second amplifier having an input coupled to the integrated antenna and an output coupled to the first connection, the second amplifier operable to apply a second amplification factor to signals received from the mobile device;

a second connection configured to be coupled to a power adapter to provide power to the bidirectional amplifier; and a base configured to enable the mobile device cradle to be mounted to a vehicle.

2. The mobile device cradle of claim 1, wherein the base enables a user to mount the mobile device cradle to the interior of a vehicle.

3. The mobile device cradle of claim 1, wherein the external antenna is located on the exterior of the vehicle.

4. A mobile device cradle, comprising:

a body;

one or more docking members extending from the body, the one or more docking members configured to removably receive a mobile device operable to send and receive communications via a communication network in the form of signals;

a connection extending from the body and configured to be coupled to a first antenna, the first antenna comprising an external antenna operable to communicate the signals to and from a base station of the communication network;

a second antenna integrated in the body and operable to communicate signals to and from an antenna of the mobile device;

a bidirectional amplifier integrated into the body, the bidirectional amplifier comprising:

a first amplifier having an input coupled to the connection and an output coupled to the second antenna, the first amplifier being operable to apply a first amplification factor to signals received from the base station; and a second amplifier having an input coupled to the second antenna and an output coupled to the connection, the second amplifier operable to apply a second amplification factor to signals received from the mobile device;

a dock connector coupled to the body and configured to provide an electrical connection between the body and the mobile device when the mobile device is received by the docking members;

an integrated breakout connector associated with the body and configured to receive data signals from or send data signals to an external device, the data signals received from the external device configured to be sent to the mobile device through the dock connector and the data signals sent to the external device originating from the mobile device; and a base configured to enable the mobile device cradle to be mounted to a vehicle.

5. The mobile device cradle of claim 4, wherein the base for mounting the mobile device cradle enables a user to mount the mobile device cradle to the interior of a vehicle.

6. The mobile device cradle of claim 4, wherein the external antenna is located on the exterior of the vehicle.

7. The mobile device cradle of claim 1, further comprising a dock connector coupled to the body and configured to provide an electrical connection between the body and the mobile device when the mobile device is received by the docking members.

8. The mobile device cradle of claim 7, further comprising an integrated breakout connector associated with the body and configured to receive data signals from or send data signals to an external device, the data signals received from the external device configured to be sent to the mobile device through the dock connector and the data signals sent to the external device originating from the mobile device.

9. The mobile device cradle of claim 1, wherein the integrated antenna in the body is operable to communicate signals to and from a plurality of mobile devices that include the mobile device, each of the plurality of mobile devices operable to send and receive communications via a communication network in the form of signals.

10. The mobile device cradle of claim 9, wherein the second amplifier is operable to apply the second amplification factor to signals received from the plurality of mobile devices.

* * * * *